(12) United States Patent
Walter

(10) Patent No.: US 7,735,372 B2
(45) Date of Patent: Jun. 15, 2010

(54) ELECTRONIC PRESSURE SWITCH

(75) Inventor: Heinz Walter, Hergatz (DE)

(73) Assignee: i f m electronic GmbH, Essen (DE)

( * ) Notice: Subject to any disclaimer, the term of this patent is extended or adjusted under 35 U.S.C. 154(b) by 783 days.

(21) Appl. No.: 11/678,081

(22) Filed: Feb. 23, 2007

(65) Prior Publication Data

US 2007/0205777 A1 Sep. 6, 2007

(30) Foreign Application Priority Data

Feb. 23, 2006 (DE) ........................ 10 2006 008 972

(51) Int. Cl.
*G01L 9/00* (2006.01)
(52) U.S. Cl. .......................................... 73/705; 73/753
(58) Field of Classification Search ........................ None
See application file for complete search history.

(56) References Cited

U.S. PATENT DOCUMENTS

| | | | | |
|---|---|---|---|---|
| 4,404,856 A * | 9/1983 | Honda et al. | ................... | 73/765 |
| 4,862,382 A | 8/1989 | Schneider et al. | | |
| 5,107,710 A | 4/1992 | Huck et al. | | |
| 5,532,582 A * | 7/1996 | Egami | ........................ | 324/130 |
| 5,877,637 A * | 3/1999 | Trofimenkoff et al. | ...... | 327/101 |
| 5,909,132 A * | 6/1999 | Trofimenkoff et al. | ...... | 327/101 |
| 6,522,249 B1 | 2/2003 | Lonigro et al. | | |
| 7,034,700 B2 * | 4/2006 | Kurtz et al. | ................. | 340/626 |
| 7,085,657 B2 | 8/2006 | Drossel | | |
| 7,458,656 B2 * | 12/2008 | Smith | .......................... | 347/19 |

FOREIGN PATENT DOCUMENTS

WO 03 021195 A1 3/2003

OTHER PUBLICATIONS

Adaptation of Strain Gauges to Battery Supplied Data Collectors, Mielentz et al., Elektronik, Feb. 1993, pp. 14-17, English Summary of Article Attached.

* cited by examiner

*Primary Examiner*—Lisa M Caputo
*Assistant Examiner*—Jermaine Jenkins
(74) *Attorney, Agent, or Firm*—David S. Safran; Roberts Mlotkowski Safran & Cole, P.C.

(57) ABSTRACT

An electronic pressure switch has only two terminals, a resistance measuring bridge pickup, an amplifier unit downstream of the resistance measuring bridge, a comparator connected to the amplifier unit and a switching stage downstream of the comparator achieves a lower residual current in the blocked state and a lower voltage drop in the switched state. The resistance measuring bridge has a high internal resistance and the amplifier unit supplies both an analog measurement signal corresponding to the analog measured value of the resistance measuring bridge and a threshold value to the comparator at low resistance. A high-resistance balancing network is assigned to the resistor network, and an in-phase regulator on the input side limits and controls the supply voltage of the resistance measuring bridge, the amplifier unit, the comparator and the balancing network and the switching stage is made as a shunt controller triggered by the output of the comparator.

16 Claims, 2 Drawing Sheets

ELECTRONIC PRESSURE SWITCH

BACKGROUND OF THE INVENTION

1. Field of the Invention

The invention relates to an electronic pressure switch for only two supply leads, with a resistance measuring bridge as a pickup, with an amplifier unit connected downstream of the resistance measuring bridge, with a comparator connected downstream of the amplifier unit and with a switching stage connected downstream of the comparator.

2. Description of Related Art

The above described type electronic pressure switch serves as the starting point for the invention, and will be explained with regard to the following aspects.

First of all, the subject matter of the invention is an electronic switching device which switches, i.e., passes from the non-conductive state into the conductive state or from the conductive state into the non-conductive state when the pressure in a liquid or a gas exceeds or fails to the reach a given threshold value. Therefore, a pressure switch can also regarded as a digital pressure measuring device. While an analog pressure measuring device at its output provides an output signal which is proportional to the measured pressure, therefore an output voltage proportional to the measured pressure or an output current proportional to the measured pressure, a pressure switch as a digital pressure measuring device delivers only two different output signals, specifically "measured pressure above a given value" or "measured pressure below a given value".

What is important for the electronic pressure switch to which the invention relates is that it is designed for only two supply leads, and therefore, has only two terminals for only two supply leads. Therefore, it is an electronic switching device which can be connected via an outer conductor to one pole of an operating voltage source and only via another outer conductor to the terminal of a consumer or of a control circuit, and the other terminal of the consumer or of the control circuit is connected or can be connected to the other pole of the operating voltage source.

Electronic switching devices of the type under consideration have been used for decades instead of electrical, mechanically actuated switching devices which do not have a solid state construction. In terms of their operation as switching devices, almost no residual current will flow in the electronic switching devices under consideration in the blocked state and almost no voltage drop will occur in the conductive state. However, if no residual current were to flow in switching devices of the type under consideration in the blocked state, no supply current could be obtained for the circuit provided within the switching device, and if in the conductive state no voltage drop were to occur, no supply voltage for the circuit within the switching device could be obtained either, it applies to all electronic switching devices for only two outer conductors that, in the blocked state, a residual current flows and in the conductive state a voltage drop occurs. This results in that, even if unintentionally but functionally necessary in the blocked state, a residual current flows and in the conductive state a voltage drop occurs, the residual current and the voltage drop will be as small as possible. This problem has already been extensively treated.

It was stated initially that the electronic pressure switch under consideration includes a resistance measuring bridge as a pickup. Instead of a resistance measuring bridge, another circuit can also be used with which a measurement signal proportional to the prevailing pressure can be generated. In particular, the pickup can also be formed of GMR elements (i.e., giant magneto resistance elements). While an electronic pressure switch with a resistance measuring bridge as the pickup is described below, the teaching of the invention is not limited thereto; it can also be easily applied to pressure switches with another type of pickup, especially pressure switches in which the pickup is formed of GMR elements, also to electronic switching devices with other pickups, for example, position sensors in which the pickup is formed of GMR elements.

An electronic pressure switch for only two supply leads which on the market from the company UNITED ELECTRIC CONTROLS, 180 Dexter Avenue, Watertown, Mass. 02471-9143, USA, and is also the subject matter of patent publications, specifically U.S. Pat. No. 6,522,249 and PCT patent application publication WO 03/021,195. This electronic pressure switch, in the blocked state, has a residual current of roughly 0.75 milliamps, and in the conductive state, a voltage drop of up to roughly 7 V. These are relatively large values. The residual current of roughly 0.75 milliamps is critical, for example, in higher resistance applications in input circuits of optical couplers because, there, the blocked state can no longer be recognized. The voltage drop of up to roughly 7 volts in the switched state greatly limits applications, since the operating voltage, for example, for a consumer, is reduced by roughly 7 volts. Furthermore, the maximum switched current must be limited because a heat loss results from the product of the switched current and the voltage drop.

SUMMARY OF THE INVENTION

A primary object of the present invention is, consequently, to devise an electronic pressure switch of the type under consideration, i.e., one for only two outer conductors, which is characterized by a lower residual current in the blocked state and/or by a lower voltage drop in the switched state.

The electronic switching device in accordance with the invention in which the aforementioned object is achieved is characterized, first of all, essentially in that the resistance measuring bridge has an especially high internal resistance and that the amplifier unit supplies both an analog measurement signal corresponding to the analog measured value of the resistance measuring bridge and also a threshold value to the comparator at low resistance. The high internal resistance of the resistance measuring bridge, preferably greater than 20 kiloohms, is a first step toward reducing the necessary supply current for the circuit provided within the switching device, and thus, toward reducing the residual current flowing in the blocked state of the pressure switch. A second step in the same direction lies in that the amplifier unit supplies both an analog measurement signal corresponding to the analog measured value of the resistance measuring bridge and also the threshold value to the comparator at low resistance; the threshold value for the comparator is therefore not separately generated.

In the electronic pressure switch in accordance with the invention, the resistance measuring bridge is preferably made as a strain gauge pressure measuring cell with a steel membrane and strain gauges applied to the steel membrane. These strain gauge pressure measuring cells have been in use for a long time. The advantage of the steel membrane used here is mainly the enormous burst pressure strength.

In strain gauge pressure measuring cells of the aforementioned type, the useful resistances belonging to the resistance measuring bridge are implemented by a thick film process. This thick film process is highly subject to tolerances, as is recognized, so that the electrical zero point can vary up to +/−2500% (!) relative to the measurement signal which can be generated. Consequently, balancing measures are necessary. Preferably, there is a high-resistance balancing network for this purpose; it is applied to the steel membrane in the same manner as the useful resistances; the cross resistance of the balancing network can be in the three-digit kiloohm range. So that the high-resistance balancing network has the same temperature coefficient as the actual resistance measuring bridge, it is recommended that the trimming resistors of the balancing network of the same resistance paste as the useful resistances of the resistance measuring bridge be applied to the steel membrane.

With the above described balancing measure, only coarse balancing is possible, specifically, balancing with a balancing power of +/−2500% to a maximum +/−100%. Consequently, it is recommended that still another balancing measure for fine balancing be implemented. For this purpose, a high-resistance resistor network with a balancing power of +/−100% to 0% can be used. This high-resistance resistor network no longer necessarily requires the same temperature sensitivity as the useful resistances of the resistance measuring bridge, because its temperature influence remains tolerable as a result of the voltage divider circuit.

The electronic pressure switch in accordance with the invention, as stated, will not only have a low residual current in the blocked state, but also a low voltage drop in the conductive state. Therefore, the resistance measuring bridge made with high resistance must be operated with a very low supply voltage. At a supply voltage for the resistance measuring bridge of 1.8 volts, a bridge signal, as a measurement signal, of only roughly 6 millivolts can be expected. This measurement signal must be amplified with a relatively large factor, for example, with a factor of 300, in order to be able to demand a decision with one percent accuracy from the downstream comparator. For this purpose, in a preferred embodiment of the electronic pressure switch in accordance with the invention, it is provided that the amplifier unit is made as an instrument amplifier, also called an electrometer amplifier, so that the resistance measuring bridge is essentially not loaded by the amplifier unit.

In the preferred embodiment of the electronic pressure switch in accordance with the invention in which the amplifier unit is made as an instrument amplifier, the amplifier unit is preferably made in two-stages, specifically, the amplifier unit has two operational amplifiers which are produced preferably monolithically from one chip in order to obtain temperature synchronism of the offset voltages. When the outputs of the resistance measuring bridge are connected to like inputs of the operational amplifiers, preferably to the noninverting inputs of the operational amplifiers, the offset voltages mutually compensate for one another. In this connection, then, the output voltage of the first operational amplifier changes only a little over pressure, and moreover, in the opposite direction, so that the output voltage can be supplied directly with low resistance to the comparator as a threshold value. The output voltage of the second operational amplifier constitutes the actual measurement signal; it is likewise supplied with low resistance to the comparator.

In one especially preferred embodiment of the electronic pressure switch in accordance with the invention, there is an in-phase regulator on the input side which limits and controls the supply voltage of the resistance measuring bridge, the amplifier unit, the comparator and optionally the balancing network. Therefore, this in-phase regulator, on the one hand, provides for the supply voltage of the resistance measuring bridge, the amplifier unit, the comparator, and optionally, the balancing network to always be constant, but mainly also limited so that an unduly high supply voltage does not lead to an unnecessarily high supply current, and thus, to an overly high residual current. Advantageously, the resistance measuring bridge, the amplifier unit, the comparator, and optionally, the balancing network are connected in parallel with respect to the supply voltage and the parallel circuit is connected downstream of the in-phase regulator.

In the electronic pressure switch in accordance with the invention, the switching stage can be made as a DC switching stage, as an AC switching stage, or as an all-current switching stage, i.e., switching both direct current and also alternating current. However, preferably, the switching feed is made as a DC switching stage.

Finally, another teaching of the invention which also acquires special importance for itself, therefore separate from the teachings described so far, is to make the switching stage as a shunt controller triggered by the output of the comparator. In this embodiment, the output signal at the output of the comparator decides about connection of the shunt controller. When triggered, the shunt controller limits the voltage drop, for example, to 2.5 volts, so that, on the one hand—via the in-phase regulator which is preferably provided—enough supply voltage is available for the electronic circuit in the pressure switch, but, on the other hand, in the conductive state of the pressure switch, only a voltage drop of for example 2.5 volts occurs, for a consumer, i.e., the original operating voltage minus 2.5 volts is available.

As stated farther above, according to the object, an electronic pressure switch of the type under consideration, therefore for only two outer conductors, will be devised which is characterized by a lower residual current in the blocked state and/or by a lower voltage drop in the switched state. The measures described first relate to the first partial object, lower residual current in the blocked state, the measure described last to the second partial object, lower voltage drop in the switched state. There are applications in which only a smaller residual current in the blocked state is important. However, there are also applications in which only a smaller voltage drop in the switched state is important. Therefore, consequently, electronic pressure switches in accordance with the invention in which only the first partial object is achieved and also electronic pressure switches in accordance with the invention in which only the second partial object is achieved are both sensible. Of course, electronic pressure switches in accordance with the invention in which both the first partial object and also the second partial object are achieved are especially advantageous.

In particular, there are various possibilities for embodying and developing the electronic pressure switch in accordance with the invention. In this connection, reference is made to the following description of one embodiment in conjunction with the accompanying drawings.

DETAILED DESCRIPTION OF THE INVENTION

Figure 1:
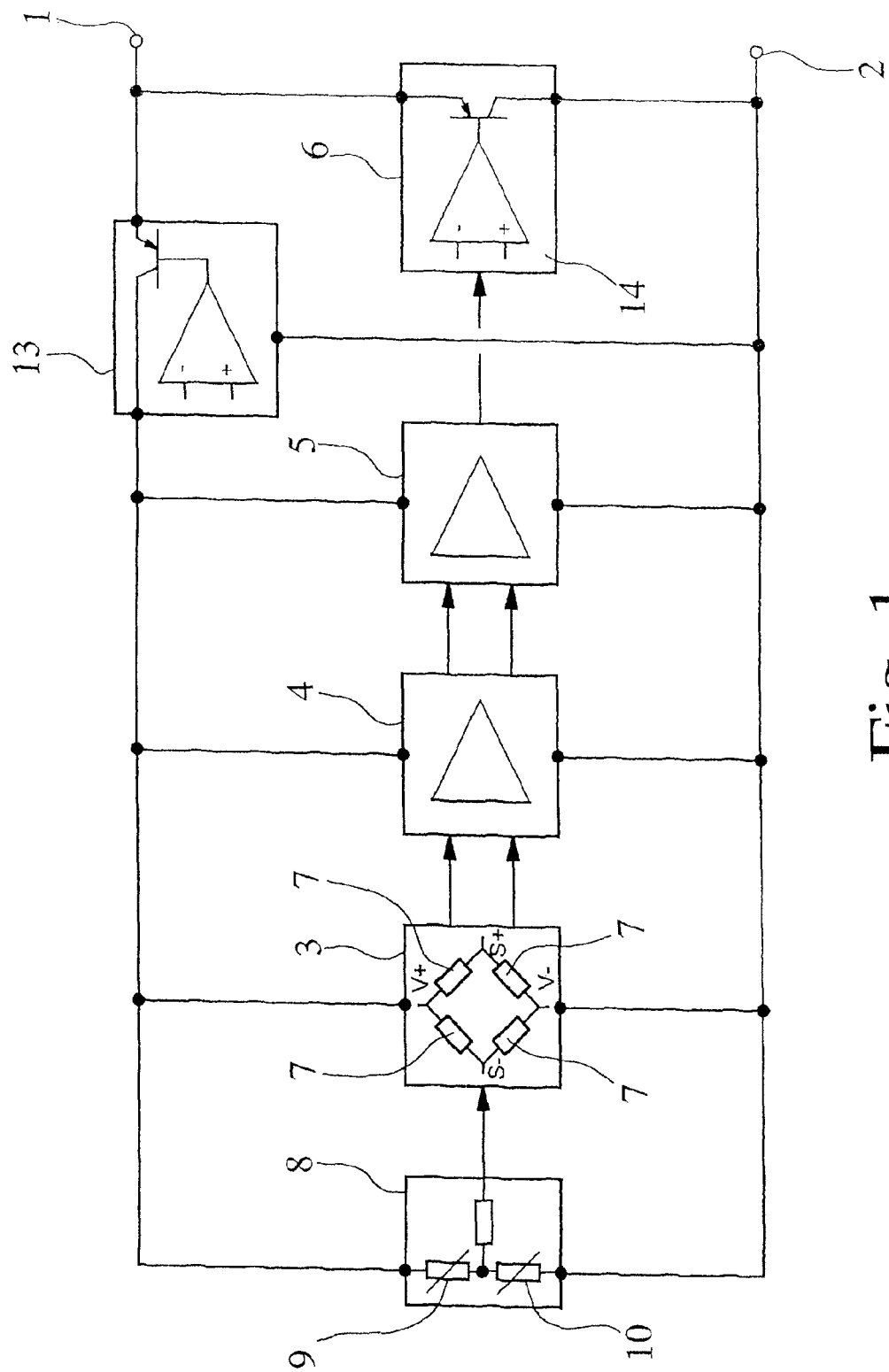
FIG. 1 is a block diagram of a preferred embodiment of an electronic pressure switch in accordance with the invention and FIG. 2 shows a preferred embodiment of an amplifier unit which belongs to the electronic pressure switch in accordance with the invention with a comparator connected on the output side.

FIG. 1 schematically shows, in the form of a block diagram, a preferred embodiment of an electronic pressure switch in accordance with the invention for only two terminal switches, and therefore, has only two terminals 1, 2. The illustrated electronic pressure switch includes a resistance measuring bridge 3 as a pickup, an amplifier unit 4 connected downstream of the resistance measuring bridge 3, a comparator 5 connected downstream of the amplifier unit 4, and a switching stage 6 connected downstream of the comparator 5.

In accordance with the invention, the resistance measuring bridge 3 has an especially high internal resistance; the internal resistance of the resistance measuring bridge 3 is preferably greater than 20 kiloohms. Furthermore, in accordance with the invention, it is the amplifier unit 4 supplies both an analog measurement signal corresponding to the analog measured value of the resistance measuring bridge and also a threshold value to the comparator 5 at low resistance.

The resistance measuring bridge 3 can be made as a strain gauge pressure measuring cell with a steel membrane and strain gauges applied to the steel membrane as useful resistances 7. As a balancing measure, there is a high-resistance balancing network 8 with trimming resistors 9, 10; the cross resistance of the balancing network 8 can be in the three-digit kiloohm range. So that the high-resistance balancing network has the same temperature coefficient as the actual resistance measuring bridge 3, the trimming resistors 9, 10 of the balancing network 8 are made of the same resistance paste as the useful resistances 7 of the resistance measuring bridge that are applied to the steel membrane (not shown).

As explained initially, with the above described balancing measure, only coarse balancing can be implemented, specifically with a balancing power of +/−2500% to a maximum +/−100%. Still another balancing measure for fine balancing is described above, a balancing measuring with a balancing power of +/−100% to 0%. This balancing measure is not described in the embodiment.

Figure 2:
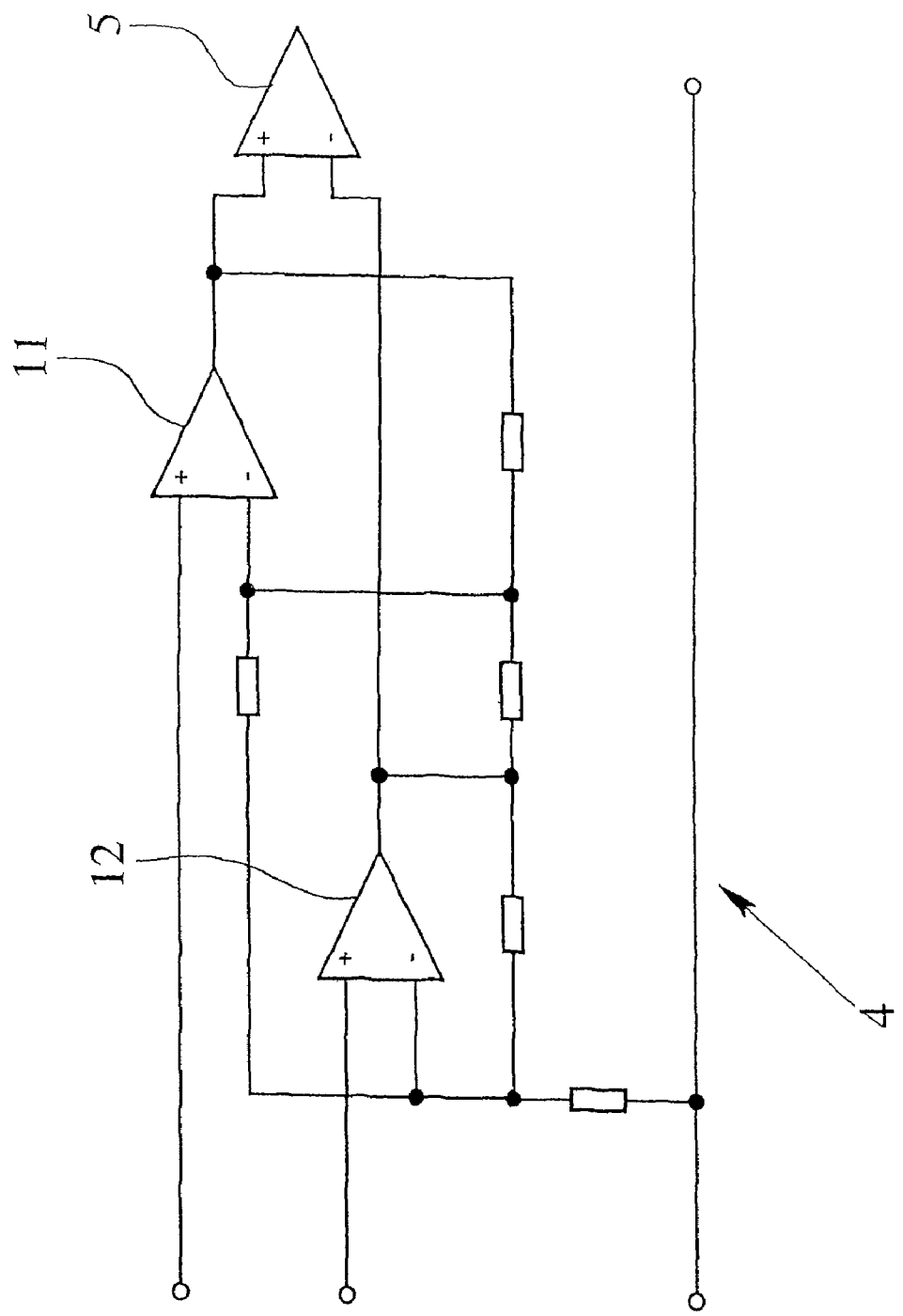

As shown in FIG. 2, in the illustrated preferred embodiment of an electronic pressure switch in accordance with the invention, the amplifier unit 4 is made as an instrument amplifier, also called an electrometer amplifier, in two-stages. The amplifier unit 4 has specifically two operational amplifiers 11, 12, which are produced monolithically from one chip. The outputs of the resistance measuring bridge 3 are connected to like inputs of the operational amplifiers 11, 12, specifically to the noninverting inputs of the operational amplifiers 11, 12. The outputs of the two operational amplifiers 11, 12 are connected directly to the inputs of the comparator 5.

As FIG. 1 shows, in the illustrated preferred embodiment of the electronic pressure switch in accordance with the invention, there is an in-phase regulator 13 on the input side which limits and controls the supply voltage of the resistance measuring bridge 3, the amplifier unit 4, the comparator 5 and the balancing network 8. As FIG. 1 shows, the resistance measuring bridge 3, the amplifier unit 4, the comparator 5 and the balancing network 8 are connected in parallel with respect to the supply voltage and this parallel circuit is connected downstream of the in-phase regulator 13.

Finally, FIG. 1 shows an especially preferred embodiment of the electronic pressure switch in accordance with the invention insofar as the switching stage is made as a shunt controller 14 which is controlled by the output of the comparator 5.

Specifically, a situation can be easily attained in which in the electronic pressure switch in accordance with the invention in which the residual current is less than 0.5 milliamp in the blocked state and the voltage drop in the conductive state is less than 2.5 volts. In particular, the following can be accomplished:

for a resistance measuring bridge 3, a supply current of 90 microamps, for the amplifier unit 4, a supply current of 110 microamps, for the comparator 5, a supply current of 50 microamps, for the balancing network 8, a supply current of 25 microamps and for the in-phase regulator 13, a supply current of 50 microamps as well as on the shunt controller 14—and thus, on the pressure switch in accordance with the invention overall—in the conductive state, a voltage drop of 2.3 volts.

What is claimed is:

1. Electronic pressure switch for only two supply leads, comprising:
a resistance measuring bridge as a pickup,
an amplifier unit connected downstream of the resistance measuring bridge,
a comparator connected downstream of the amplifier unit, and
a switching stage connected downstream of the comparator,
wherein the resistance measuring bridge has a high internal resistance and the amplifier unit supplies both an analog measurement signal corresponding to an analog measured value of the resistance measuring bridge and supplies a threshold value to the comparator at low resistance.

2. Electronic pressure switch 1, wherein the resistance measuring bridge has an internal resistance greater than 20 kiloohms.

3. Electronic pressure switch in accordance with claim 1, wherein the resistance measuring bridge is a strain gauge pressure measuring cell with a steel membrane and strain gauges applied to the steel membrane.

4. Electronic pressure switch in accordance with claim 1, wherein the resistance measuring bridge is connected downstream of a high-resistance balancing network.

5. Electronic pressure switch in accordance with claim 4, wherein useful resistances of the resistance measuring bridge and the trimming resistors of the balancing network have the same temperature coefficient.

6. Electronic pressure switch in accordance with claim 1, wherein the amplifier unit is an instrument amplifier.

7. Electronic pressure switch in accordance with claim 6, wherein the amplifier unit is a two stage amplifier.

8. Electronic pressure switch in accordance with claim 7, wherein the amplifier unit comprises two operational amplifiers.

9. Electronic pressure switch in accordance with claim 8, wherein the two operational amplifiers are monolithic parts of a single chip.

10. Electronic pressure switch in accordance with claim 8, wherein the outputs of the resistance measuring bridge are connected to like inputs of the operational amplifiers.

11. Electronic pressure switch in accordance with claim 10, wherein the like inputs of the operational amplifiers are noninverting inputs of the operational amplifiers.

12. Electronic pressure switch in accordance with claim 8, wherein the outputs of the two operational amplifiers are connected to inputs of the comparator.

13. Electronic pressure sensor in accordance with claim 1, wherein an in-phase regulator which limits and controls the supply voltage of the resistance measuring bridge, the amplifier unit, the comparator is provided on an input side of the sensor.

14. Electronic pressure sensor in accordance with claim 13, wherein the resistance measuring bridge, the amplifier unit, the comparator are connected in parallel with respect to a supply voltage and the parallel circuit is connected downstream of the in-phase regulator.

15. Electronic pressure sensor in accordance with claim 1, wherein the switching stage is selected from the group consisting of a DC switching stage, an AC switching stage, and an all-current switching stage.

16. Electronic pressure sensor in accordance with claim 1, wherein the switching stage is a shunt controller triggered by the output of the comparator.

* * * * *